United States Patent
Baker

(10) Patent No.: US 11,307,253 B2
(45) Date of Patent: Apr. 19, 2022

(54) SELF-TEST OF AN ASYNCHRONOUS CIRCUIT

(71) Applicant: Cryptography Research, Inc., San Jose, CA (US)

(72) Inventor: Matthew Pond Baker, San Francisco, CA (US)

(73) Assignee: Cryptography Research, Inc., San Jose, CA (US)

( * ) Notice: Subject to any disclaimer, the term of this patent is extended or adjusted under 35 U.S.C. 154(b) by 0 days.

(21) Appl. No.: 17/136,198

(22) Filed: Dec. 29, 2020

(65) Prior Publication Data

US 2021/0190862 A1    Jun. 24, 2021

Related U.S. Application Data

(63) Continuation of application No. 15/903,980, filed on Feb. 23, 2018, now Pat. No. 10,884,058.

(60) Provisional application No. 62/486,769, filed on Apr. 18, 2017.

(51) Int. Cl.
| | |
|---|---|
| *G01R 31/319* | (2006.01) |
| *H04L 9/36* | (2006.01) |
| *G06F 1/06* | (2006.01) |
| *G01R 31/3187* | (2006.01) |
| *G01R 31/317* | (2006.01) |

(52) U.S. Cl.
CPC ... *G01R 31/31922* (2013.01); *G01R 31/3187* (2013.01); *G01R 31/31701* (2013.01); *G06F 1/06* (2013.01); *H04L 9/36* (2013.01); *G06F 2221/034* (2013.01)

(58) Field of Classification Search
CPC ........ G01R 31/31922; G01R 31/31701; G01R 31/3187; G06F 1/06; G06F 2221/034; H04L 9/36
See application file for complete search history.

(56) References Cited

U.S. PATENT DOCUMENTS

| | | |
|---|---|---|
| 5,416,784 A | 5/1995 | Johnson |
| 6,918,074 B2 | 7/2005 | Kim et al. |
| 9,432,298 B1 | 8/2016 | Smith |
| 2003/0023941 A1 | 1/2003 | Wang et al. |

(Continued)

OTHER PUBLICATIONS

K. Huang, T. Shen and C. Li, "Test methodology for dual-rail asynchronous circuits," 2017 54th ACM/EDAC/IEEE Design Automation Conference (DAC), Austin, TX, USA, 2017, pp. 1-6. (Year: 2017).*

(Continued)

*Primary Examiner* — Cynthia Britt
(74) *Attorney, Agent, or Firm* — Lowenstein Sandler LLP

(57) ABSTRACT

An indication of an operating mode of an asynchronous circuit may be received. A determination may be made as to whether the operating mode of the asynchronous circuit corresponds to a self-test of the asynchronous circuit. In response to determining that the operating mode of the asynchronous circuit corresponds to the self-test, a first clock signal may be provided to a first portion of a self-test component in a feedback path of the asynchronous circuit and a second clock signal may be provided to a second portion of the self-test component in the feedback path of the asynchronous circuit. Furthermore, a test value may be generated based on the first clock signal and the second clock signal.

20 Claims, 6 Drawing Sheets

(56) References Cited

U.S. PATENT DOCUMENTS

| | | |
|---|---|---|
| 2004/0193664 A1 | 9/2004 | Shimasaki |
| 2008/0159042 A1* | 7/2008 | Bertin .................. H01L 27/112 |
| | | 365/225.7 |
| 2008/0288837 A1* | 11/2008 | Peeters .......... G01R 31/318533 |
| | | 714/726 |
| 2009/0009210 A1 | 1/2009 | Te Beest et al. |
| 2011/0276850 A1 | 11/2011 | Luu et al. |
| 2013/0159803 A1 | 6/2013 | Pakbaz et al. |
| 2014/0191813 A1 | 7/2014 | Sul et al. |
| 2016/0065180 A1 | 3/2016 | Jou et al. |
| 2017/0366177 A1* | 12/2017 | Chien ..................... H03K 5/26 |

OTHER PUBLICATIONS

Alves, Vladimir C., et al., "A BIST Scheme for Asynchronous Logic", Proceedings Seventh Asian Test Symposium (ATS'98) (Cat. No. 98TB100259), Singapore, 1998, Feb. 2010, pp. 27-32, 6 pages.

Mohideen, S. Kaja, et al., "Design of Built in Self Test Asynchronous Micropipeline Using Double Edge Triggered D Flip Flop", IEEE Indicon 2005 Conference, Chennai, India, Dec. 11-13, 2005, pp. 322-326. 5 Pages.

Wang, Laung-Terng, et al., "Using Launch-on-Capture for Testing BIST Designs Containing Synchronous and Asynchronous Clock Domains", IEEE Transactions on Computer-Aided Design of Integrated Circuits and Systems, vol. 29, No. 2, Feb. 2010, pp. 299-312, 14 pages.

Zeidler, Steffen, et al., "A Survey About Testing Asynchronous Circuits", 2015 European Conference on Circuit Theory and Design (ECCTD), Trondheim, 2015, pp. 1-4, 4 Pages.

\* cited by examiner

SELF-TEST OF AN ASYNCHRONOUS CIRCUIT

RELATED APPLICATION

This application is a continuation of U.S. patent application Ser. No. 15/903,980, filed Feb. 23, 2018, which claims the benefit under 35 U.S.C. § 119(e) of U.S. Provisional Application 62/486,769, filed on Apr. 18, 2017, which are all hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
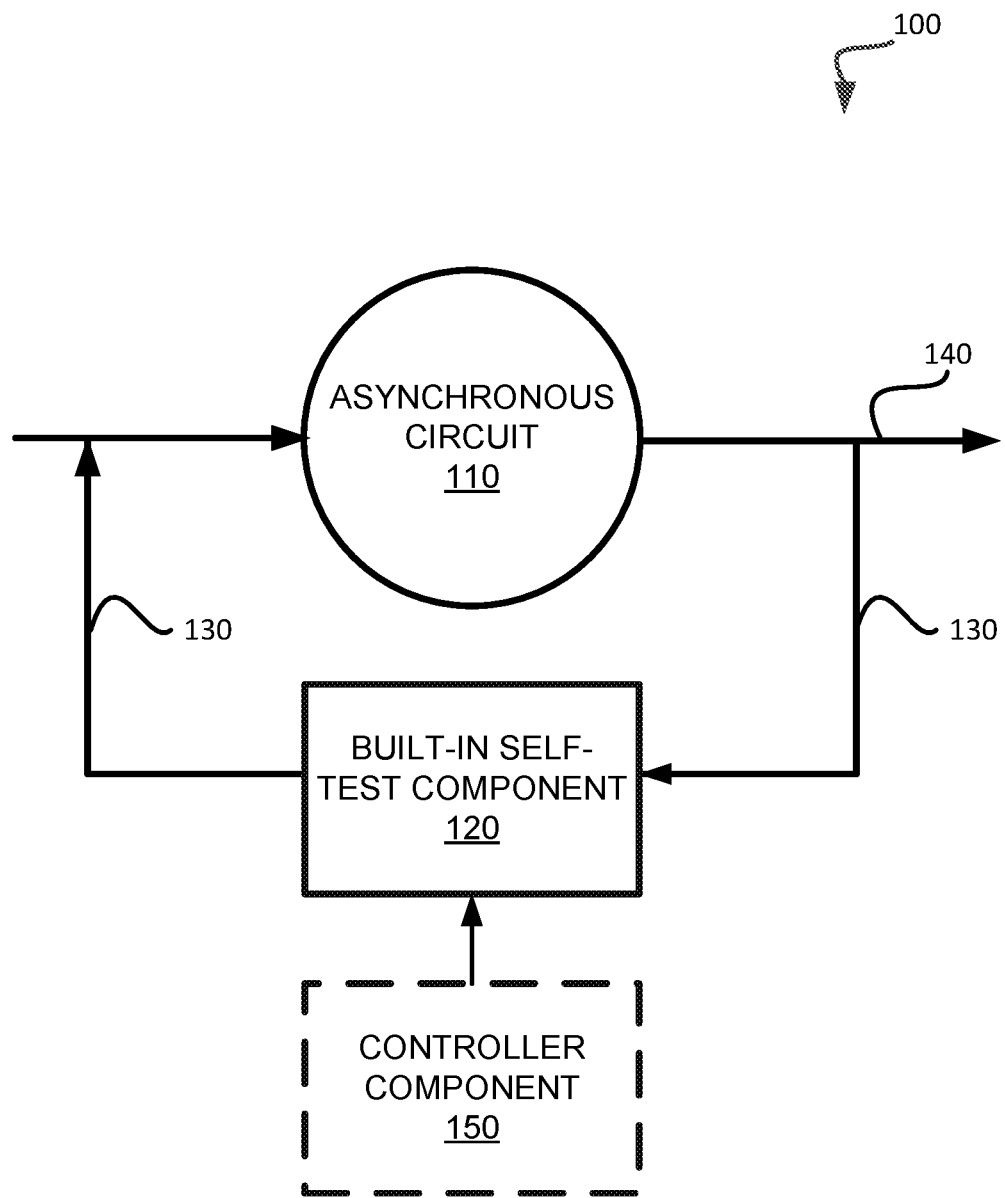
FIG. 1 illustrates an example architecture to implement self-testing of an asynchronous circuit in accordance with some embodiments.

Aspects of the present disclosure are directed to self-testing of an asynchronous circuit. In general, the asynchronous circuit may be used to perform an operation such as, but not limited to, a cryptographic operation. For example, the asynchronous circuit may provide one or more values (e.g., randomly generated values) that are used to perform a cryptographic operation. The asynchronous circuit may include a built-in self-test (BIST) component that may be used to perform a self-test of the asynchronous circuit. The results of the self-test may be used to identify the integrity of the asynchronous circuit. For example, the self-test may be used to determine whether the asynchronous circuit is functioning properly (e.g., was not manufactured with a defect) and has not been tampered with or altered by an unauthorized entity seeking to change the behavior of the asynchronous circuit to compromise the cryptographic operation.

The asynchronous circuit may not have deterministic behavior. For example, if an input data or stimulus is provided to the asynchronous circuit, the output of the asynchronous circuit may not be accurately predicted. Thus, the providing of an input data or stimulus alone to the asynchronous circuit may not be able to provide a corresponding test result that may be used to determine the integrity of the asynchronous circuit.

Aspects of the present disclosure may provide a built-in self-test component in a feedback path of the asynchronous circuit that may be enabled to change the behavior of the asynchronous circuit from non-deterministic behavior to deterministic behavior during the self-testing of the asynchronous circuit. For example, the asynchronous circuit may include a corresponding BIST component in each respective feedback path. The BIST component may be disabled during a regular operation of the asynchronous circuit when the asynchronous circuit is not performing a self-test and is generating a value for use in a cryptographic operation. When the asynchronous circuit is to perform the self-test, the BIST component in the feedback path may be enabled to change the behavior of the asynchronous circuit. The output value of the asynchronous circuit may then be compared with an expected value. If the output value and the expected value match, then the integrity of the asynchronous circuit may be confirmed (e.g., the asynchronous circuit was not manufactured with a defect and/or has not been tampered with by the unauthorized entity). However, if the output value of the asynchronous circuit after performing the self-test does not match with the expected value, then the asynchronous circuit may be considered to be defective or compromised and an alert or other such notification may be provided to indicate the failure of the asynchronous circuit.

The BIST component may include a first latch (e.g., a master latch) and a second latch (e.g., a slave latch). During an operating mode of the asynchronous circuit (e.g., when the asynchronous circuit output is used during a cryptographic operation), the first latch may transmit the output of the asynchronous circuit in response to receiving an enable signal (e.g., the first latch may sample the output based on the enable signal) and the second latch may be transparent so that the second latch transmits the output of the first latch. During the self-test mode, the first latch and the second latch may operate as a flip-flop by having a first clock signal being provided to the first latch and a second clock signal being provided to the second latch. Thus, the first latch and the second latch may receive different signals based on whether the BIST component is to perform the self-test of the asynchronous circuit or is not to perform the self-test.

Advantages of the present disclosure may include, but are not limited to, the confirmation of the integrity of the asynchronous circuit to perform sensitive cryptographic operations. For example, if the integrity of the asynchronous circuit is verified, then the performance of a cryptographic operation that uses an output of the asynchronous circuit may not be compromised by an unauthorized entity that seeks to manipulate the cryptographic operation. Furthermore, since the BIST component may include two latches in a feedback path of the asynchronous circuit, the design or topology of the asynchronous circuit is not significantly changed. As a result, the BIST component may be more easily inserted into a design of an asynchronous circuit.

FIG. 1 illustrates an example architecture 100 to implement self-testing of an asynchronous circuit. In general, the architecture 100 may be implemented by an integrated circuit such as a system on a chip (SoC) or other such device. The architecture 100 may be used to generate a value that is used as part of a cryptographic procedure.

As shown in FIG. 1, the architecture 100 may include an asynchronous circuit 110. For example, the asynchronous circuit 110 may not perform or operate based on a clock signal. Examples of such an asynchronous circuit 110 include, but are not limited to, an asynchronous pattern generator or a random number generator. For example, the asynchronous circuit 110 may be a ring oscillator or any other component that randomly generates output values 140 that are used during the performance of a cryptographic operation (e.g., generating or verifying a digital signature, decrypting or encrypting data, etc.).

The asynchronous circuit 110 may further include at least one feedback path 130 that includes a BIST component 120. For example, the BIST component 120 may receive an output value 140 of the asynchronous circuit 110 and may provide the output value 140 as another input to the asynchronous circuit 110 via the feedback path 130. The BIST component 120 may perform a self-test of the asynchronous circuit 110 in response to receiving an indication to perform a self-test. For example, the BIST component 120 may receive a control signal to configure the BIST component 120 to perform a self-test or to not perform the self-test as described in further detail below. The BIST component 120 can receive the control from a controller component 150 or a clock component as described in further detail below. In the same or alternative embodiments, the BIST component 120 may receive a first signal for a first portion or latch and a second signal for a second portion or latch. The BIST component 120 may include a first latch and a second latch as described in conjunction with FIG. 3.

Figure 2:
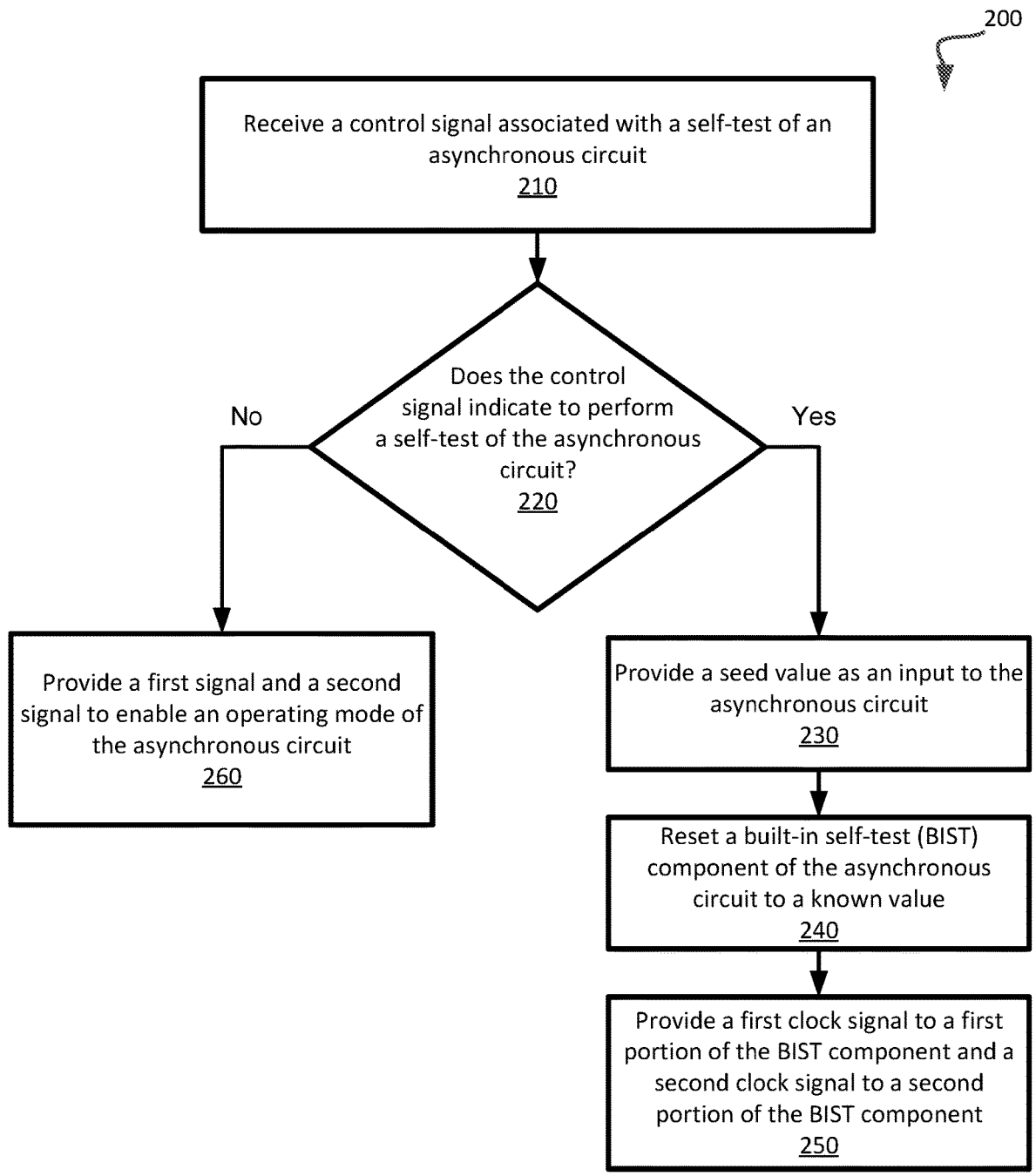
FIG. 2 is a flow diagram of an example method to perform a self-test of an asynchronous circuit in accordance with some embodiments of the present disclosure.

FIG. 2 is a flow diagram of an example method to perform a self-test of an asynchronous circuit. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the BIST component 120 of FIG. 1.

As shown in FIG. 2, the method 200 may begin with the processing logic receiving a control signal associated with a self-test of an asynchronous circuit (block 210). For example, the control signal may enable or disable a BIST component in each feedback path of the asynchronous circuit. The control signal may be received by a circuit that provides a first signal to a first latch or first portion of the BIST component and a second signal to a second latch or second portion of the BIST component. For example, the first signal may correspond to an enable input of the first portion and the second signal may correspond to another enable input of the second portion. The processing logic may subsequently determine whether the control signal indicates to perform a self-test of the asynchronous circuit (block 220). If the control signal indicates to perform the self-test, then the processing logic may provide a seed value as an input to the asynchronous circuit (block 230) and may reset the BIST component of the asynchronous circuit to a known value (e.g., a value of '0') (block 240). For example, the asynchronous circuit may be reset and an input value (e.g., the seed value) may be provided to the asynchronous circuit after the BIST component has been reset. The processing logic may subsequently provide a first clock signal to a first portion of the BIST component and a second clock signal to a second portion of the BIST component in the feedback path of the asynchronous circuit (block 250). The first clock signal and the second clock signal may not be overlapping. For example, a clock cycle of non-overlap may be present between the pulses of the first clock signal and the pulses of the second clock signal as described in conjunction with FIG. 4. The first clock signal and the second clock signal may be received by the first latch and the second latch of the BIST component so that the first latch and the second latch operate as a flip-flop. Thus, the BIST component may operate as a flip-flop in the feedback path of the asynchronous circuit when the control signal indicates to perform the self-test of the asynchronous circuit. The asynchronous circuit may then perform operations based on the input value for a number of cycles and an output of the asynchronous circuit after a particular number of cycles may be compared with an expected value to verify an integrity of the asynchronous circuit.

Otherwise, if the control signal does not indicate to perform the self-test, then the processing logic may provide a first signal and a second signal to enable an operating mode of the asynchronous circuit (block 260). For example, the first latch and the second latch of the BIST component may receive the first signal that includes one or more pulses so that the first latch may sample and transmit an output of the asynchronous circuit and the second signal with no pulses so that the second latch may be transparent (e.g., the second latch transmits its corresponding input as an output at all times as opposed to sampling when a pulse is received). Thus, the BIST component may receive an output of the asynchronous circuit and may transmit the output of the asynchronous circuit in the feedback path without modifying the output of the asynchronous circuit.

Thus, a BIST component in a feedback path may operate in a first mode that corresponds to a regular operation of an asynchronous circuit or a second mode that corresponds to a self-test operation of the asynchronous circuit.

Figure 3:
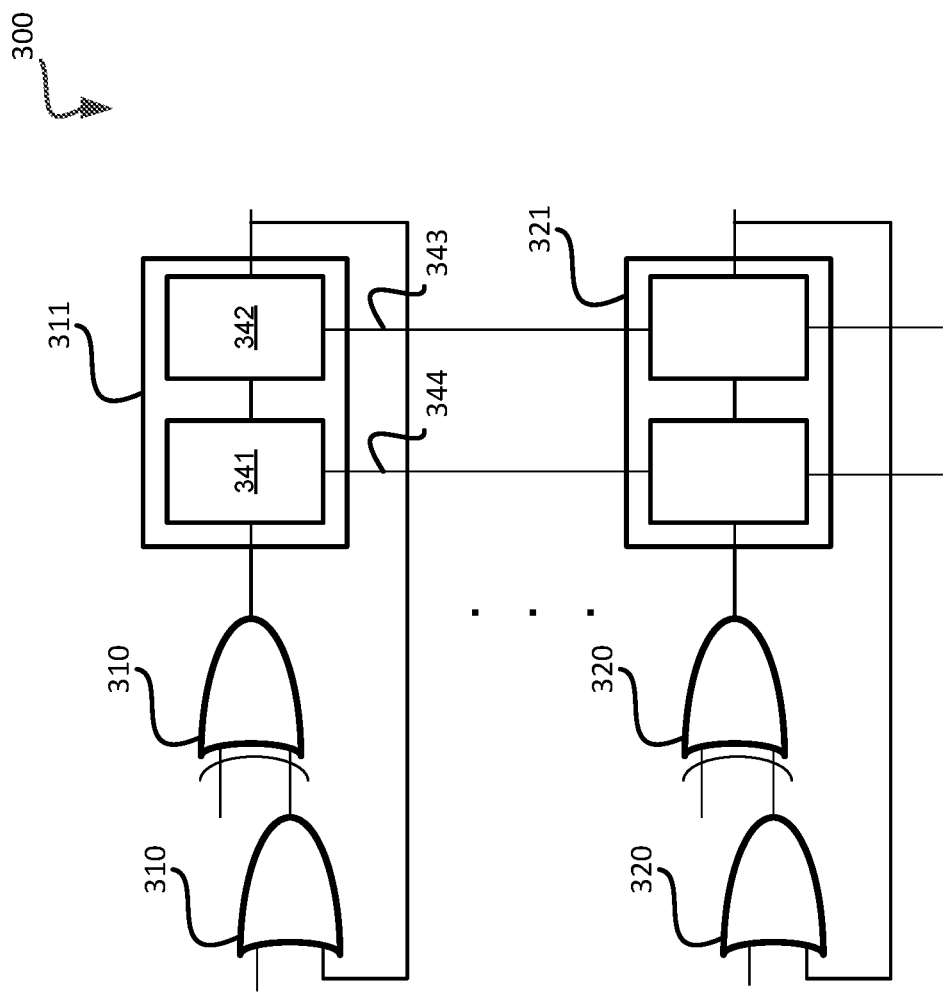
FIG. 3 is a block diagram of an embodiment of an architecture to provide self-testing of an asynchronous circuit in accordance with some embodiments.

FIG. 3 is a block diagram of an embodiment of an architecture 300 to provide self-testing of an asynchronous circuit. The architecture 300 may correspond to an architecture of the asynchronous circuit 110 and the built-in self-test component 120 of FIG. 1.

As shown in FIG. 3, the architecture 300 may include one or more feedback paths. For example, each feedback path in the architecture 300 may include a corresponding component. As shown, a first feedback path associated with logic components 310 may include a first BIST component 311 and a second feedback path associated with logic components 320 may include a second BIST component 321. Each of the BIST components 311 and 321 may include a first portion and a second portion. For example, each of the first portion and the second portion may be a separate memory element. Examples of a memory element include, but are not limited to, a latch. For example, a BIST component may include the first latch 341 and the second latch 342 where each of the first and second latches may each be a D-latch where the first latch 341 is a master latch and the second latch 342 is a slave latch. During the regular operation or operating mode of the asynchronous circuit, the enable input for the first latch 341 may be at a first value (e.g., '1') so that the first latch 341 is transparent and the enable input for the second latch 342 may be at the same first value (e.g., '1') so that the second latch 342 is also transparent. During the self-test operation, the first latch 341 and the second latch 342 may receive separate clock signals as described with regard to FIG. 4 so that the first latch 341 is closed (e.g., by the enable input receiving a value of '0' so that an output of the asynchronous circuit may be sampled) and the second latch 342 is enabled at separate times. As illustrated in FIG. 3, the first latch 341 receives a first clock signal 344 and the second latch 342 receives a second clock signal 343. The first clock signal 344 can correspond to first clock signal 420 of FIG. 4 and the second clock signal 343 can correspond to second clock signal 430 of FIG. 4. In some embodiments, when a corresponding d-latch is enabled (e.g., a pulse is received), then the D-latch may sample the input and transmit the sampled input and may continue to transmit the sampled input when the D-latch is no longer enabled. The sampled input may change when the D-latch is enabled again so that new sampled input may be provided as an output of the D-latch.

Figure 4:
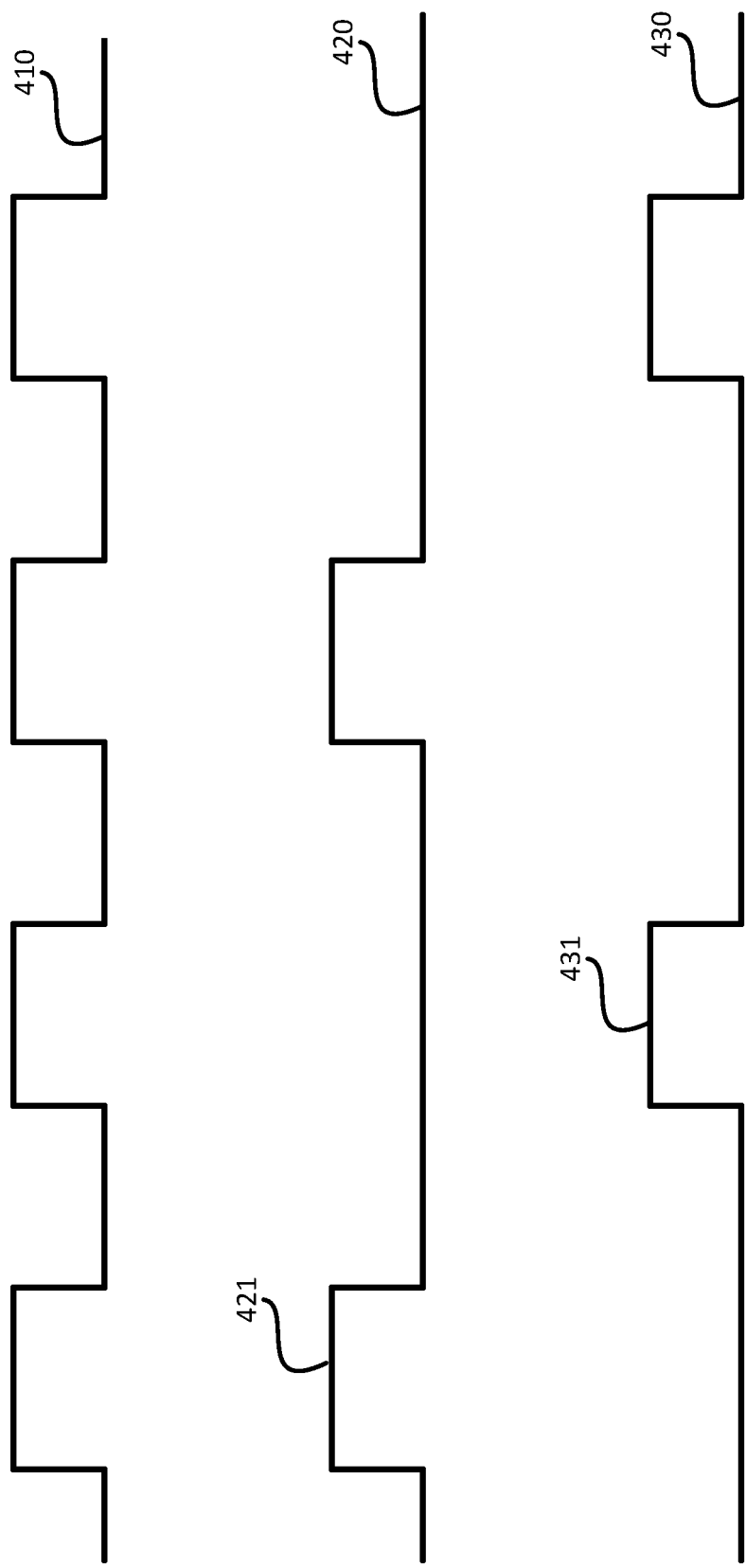
FIG. 4 illustrates example clock signals to implement self-testing of an asynchronous circuit in accordance with some embodiments of the present disclosure.

FIG. 4 illustrates example clock signals to implement self-testing of the asynchronous circuit. In general, the clock signals may represent a system clock and additional clock signals received by the built-in self-test component 120 of FIG. 1.

As shown in FIG. 4, a system clock signal 410 may be used to generate the first clock signal 420 and the second clock signal 430. The system clock signal 410 may be at a first frequency and the first clock signal 420 and the second clock signal 430 may each be at a second frequency that is half of the first frequency of the system clock signal 410. The first clock signal 420 may be received by a master latch (e.g., the first latch 341 of FIG. 3) of each BIST component in an asynchronous circuit and the second clock signal 430 may be received by the corresponding slave latch (e.g., the second latch 342 of FIG. 3) of each BIST component in the asynchronous circuit when a self-test of the asynchronous circuit is to be performed. For example, the first clock signal 420 may be received by an enable input of a first portion or first latch and the second clock signal 430 may be received by another enable input of a second portion or second latch of the BIST component. Furthermore, as shown, the pulses of the first clock signal 420 and the second clock signal 430 may not overlap (e.g., the phases of the clock signals are not overlapping). As a result, the pulses 421 of the first clock signal 420 may not occur at the same time as the pulses 431 of the second clock signal 430. The first clock signal 420 and the second clock signal 430 may be generated by a clock component or a controller component that may provide signals to the enable inputs of the portions (e.g., latches) of the BIST component. For example, the controller component may receive the system clock signal 410 and may generate the first and second clock signals 420 and 430 based on an indication of an operating mode of the asynchronous circuit. The controller component may provide input signals to enable inputs of latches based on the indication of the operating mode. In some embodiments, the input signals may be generated by self-timed logic or other such delay elements. For example, the input signals may be based on the system clock 410 and the self-timed logic or delay elements that operate on the system clock 410.

Figure 5:
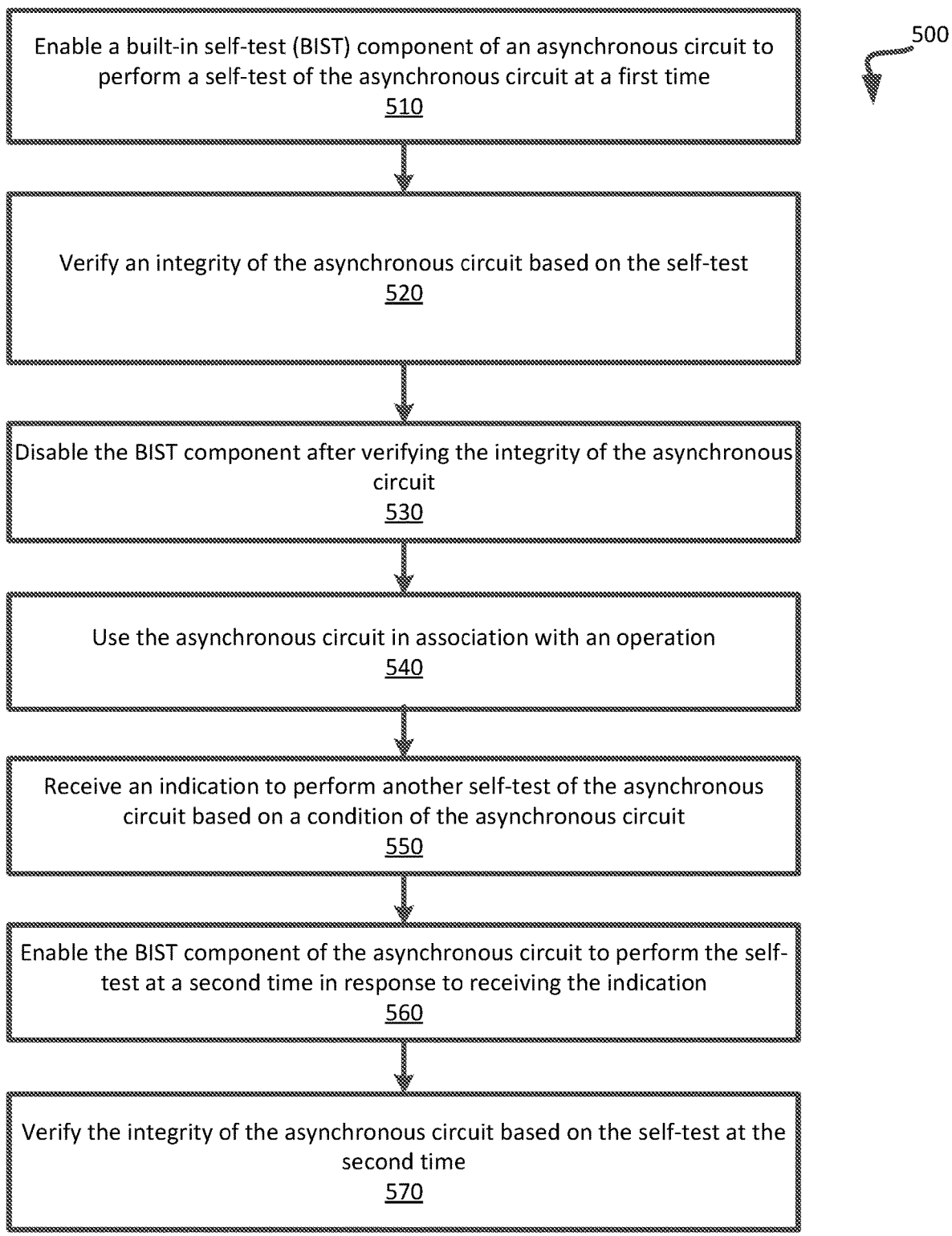
FIG. 5 illustrates a flow diagram of an example method to determine when to perform a self-test of an asynchronous circuit in accordance with some embodiments of the present disclosure.

FIG. 5 illustrates a flow diagram of an example method 500 to determine whether to perform a self-test of an asynchronous circuit. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. The method 500 may be performed by the BIST component 120 of FIG. 1.

As shown in FIG. 5, the method 500 may begin with the processing logic configuring a built-in self-test component of an asynchronous circuit to perform a self-test of the asynchronous circuit at a first time (block 510). For example, a first clock signal may be provided as an enable to a first latch of the BIST component and a second clock signal may be provided as an enable to a second latch of the BIST component. The clock signals may be provided after the asynchronous circuit has been reset. For example, the latches of the BIST component may be reset to a known value. Furthermore, the asynchronous circuit may be provided different initial test values to be used during the performance of the self-test. The processing logic may subsequently verify an integrity of the asynchronous circuit based on the self-test (block 520). For example, an output of the asynchronous circuit during the self-test may be compared with an expected value. If the output of the asynchronous circuit matches the expected value, then the asynchronous circuit may be considered to be properly functioning (e.g., the asynchronous circuit was not tampered with or includes a manufacturing defect). Subsequently, the processing logic may disable the built-in self-test component of the asynchronous circuit after verifying the integrity of the asynchronous circuit (block 530). For example, a first signal may be provided as an enable to the first latch of the BIST component and the enable of the second latch may not receive a signal to enable the second latch so that the second latch remains transparent (e.g., the second signal to the second latch does not include a pulse and the second latch transmits its input as it is received). The processing logic may then use the asynchronous circuit in association with an operation (block 540). For example, the asynchronous circuit may be used in regular operation to generate one or more values that are to be used in a cryptographic operation.

Referring to FIG. 5, the processing logic may receive an indication to perform another self-test of the asynchronous circuit based on a condition of the asynchronous circuit (block 550). For example, the indication may be based on a condition of the asynchronous circuit or a condition of a cryptographic operation to be performed by the asynchronous circuit. In some embodiments, the condition may be a number of values that have been generated by the asynchronous circuit exceeding a threshold number of generated values. For example, the self-test of the asynchronous circuit may be performed once for each time that the asynchronous circuit generates a certain number of values that are used in any cryptographic operation. In the same or alternative embodiments, the condition may be based on an amount of time that has elapsed. If an amount of time that has elapsed since the last time that the self-test of the asynchronous circuit was performed exceeds a threshold amount of time, then the indication to perform the self-test may be received. Furthermore, the indication may be received in response to a type of cryptographic operation that is to be performed. For example, a first type of cryptographic operation may result in the receiving of the indication to perform the self-test of the asynchronous circuit before the value generated by the asynchronous circuit may be used in the first type of cryptographic operation. A second type of cryptographic operation may not result in the receiving of the indication to perform the self-test. In some embodiments, the self-test may further be performed when the asynchronous circuit has not generated a value within a defined period of time.

The processing logic may configure the built-in self-test component of the asynchronous circuit to perform a self-test of the asynchronous circuit at a second time in response to receiving the indication (block 560) and may subsequently verify the asynchronous circuit based on the self-test at the second time (block 570). For example, the first clock signal and the second clock signal may be respectively received by the first latch and the second latch of the BIST component. The output of the asynchronous circuit during the self-test may then be compared with an expected value to determine the integrity of the asynchronous circuit as previously described.

Figure 6:
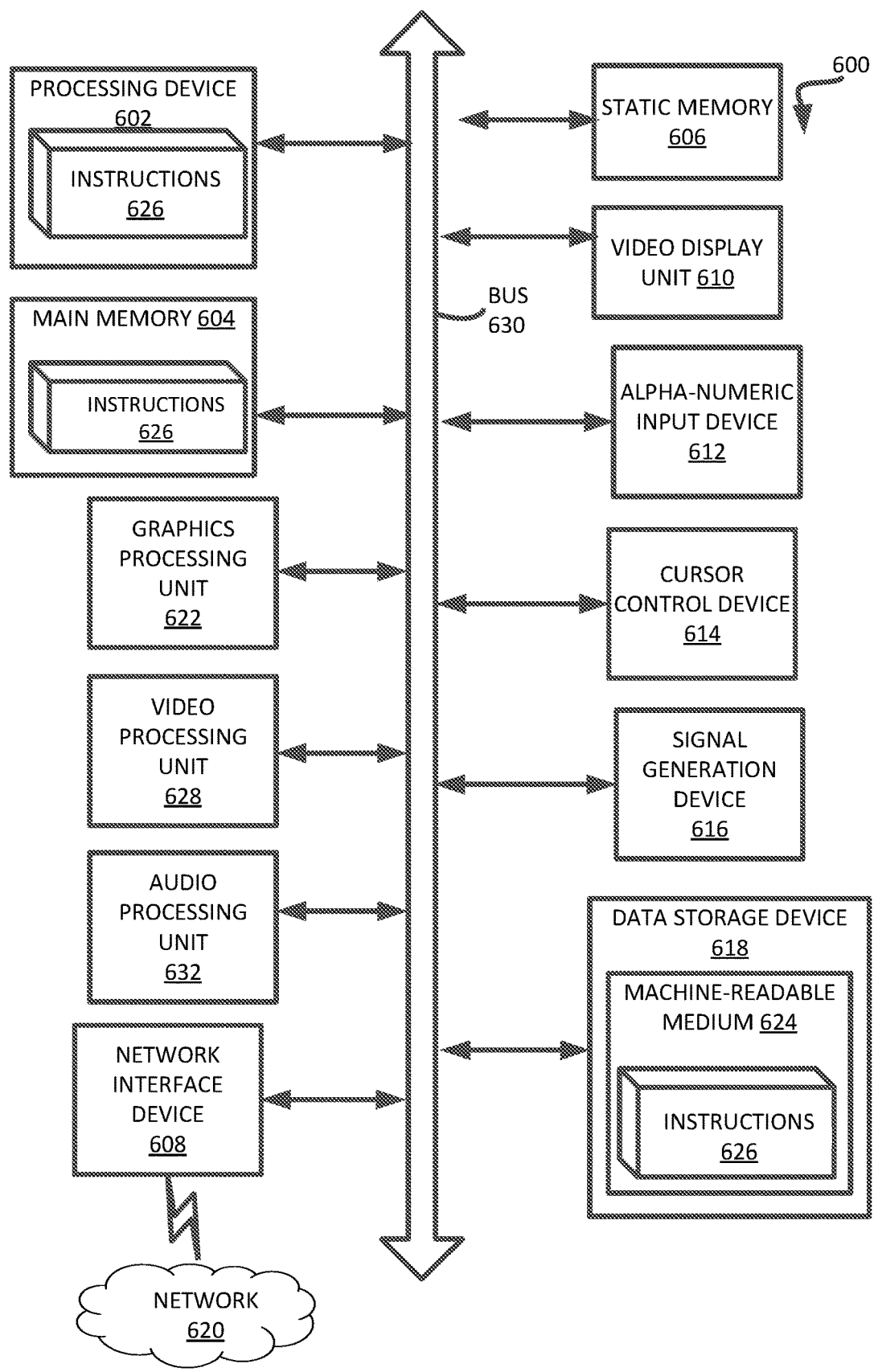
FIG. 6 illustrates a block diagram of an embodiment of a computer system in which some embodiments of the disclosure may operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to the components of a built-in self-test component (e.g., BIST component 120 of FIG. 1). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   enabling, by a controller, a feedback component of an asynchronous circuit to perform a first self-test of the asynchronous circuit at a first time;
   verifying, by the controller, an integrity of the asynchronous circuit based on the first self-test at the first time;
   disabling, by the controller, the feedback component after verifying the integrity of the asynchronous circuit at the first time;
   enabling, by the controller, the feedback component of the asynchronous circuit to perform a second self-test of the asynchronous circuit at a second time in response to a condition of the asynchronous circuit;
   verifying, by the controller, the integrity of the asynchronous circuit based on the second self-test at the second time; and
   disabling, by the controller, the feedback component after verifying the integrity of the asynchronous circuit at the second time.

2. The method of claim 1, further comprising determining a number of values that have been generated by the asynchronous circuit, wherein the condition is the number of values that have been generated by the asynchronous circuit exceeding a threshold number.

3. The method of claim 1, further comprising determining an amount of time that has elapsed since the first time, wherein the condition is the amount of time exceeding a threshold amount of time.

4. The method of claim 1, further comprising determining a type of cryptographic operation to be performed, wherein the condition is the type of cryptographic operation to be performed.

5. The method of claim 1, wherein the asynchronous circuit comprises a first portion and a second portion, wherein enabling the feedback component comprises:
   providing, by the controller, a first clock signal to the first portion of the asynchronous circuit; and
   providing, by the controller, a second clock signal to the second portion of the asynchronous circuit.

6. The method of claim 5, wherein providing the first clock signal and the second clock signal changes the asynchronous circuit from a deterministic behavior to a non-deterministic behavior.

7. An integrated circuit comprising:
   an asynchronous circuit comprising a feedback component in a feedback path of the asynchronous circuit; and
   a controller, operatively coupled with the asynchronous circuit, to:
      enable the feedback component to perform a first self-test of the asynchronous circuit at a first time;
      verify an integrity of the asynchronous circuit based on the first self-test at the first time;
      disable the feedback component after verifying the integrity of the asynchronous circuit at the first time;
      enable the feedback component of the asynchronous circuit to perform a second self-test of the asynchronous circuit at a second time in response to a condition of the asynchronous circuit;
      verify the integrity of the asynchronous circuit based on the second self-test at the second time; and
      disable the feedback component after verifying the integrity of the asynchronous circuit at the second time.

8. The integrated circuit of claim 7, wherein the feedback component comprises a first latch and a second latch.

9. The integrated circuit of claim 8, wherein, to enable the feedback component, is to:
   provide a first clock signal to the first latch and a second clock signal to the second latch, the first clock signal to enable the first latch and the second clock signal to not enable the second latch, the second latch being transparent when it is not enabled, and wherein the asynchronous circuit generates a value that is used in a cryptographic operation based on the first clock signal and the second clock signal.

10. The integrated circuit of claim 9, wherein providing the first clock signal and the second clock signal changes the asynchronous circuit from a non-deterministic behavior to a deterministic behavior.

11. The integrated circuit of claim 7, wherein the asynchronous circuit is a random number generator to generate one or more random values that are used in a cryptographic operation.

12. The integrated circuit of claim 7, wherein the controller is further to determine a number of values that have been generated by the asynchronous circuit, wherein the condition is the number of values that have been generated by the asynchronous circuit exceeding a threshold number.

13. The integrated circuit of claim 7, wherein the controller is further to determine an amount of time that has elapsed since the first time, wherein the condition is the amount of time exceeding a threshold amount of time.

14. The integrated circuit of claim 7, wherein the controller is further to determine a type of cryptographic operation to be performed, wherein the condition is the type of cryptographic operation to be performed.

15. A system comprising:
   a memory; and
   a processing device, operatively coupled with the memory, the processing device comprising a controller and an asynchronous circuit with a feedback component in a feedback path of the asynchronous circuit, wherein the controller is to:
      enable the feedback component to perform a first self-test of the asynchronous circuit at a first time;
      verify an integrity of the asynchronous circuit based on the first self-test at the first time;
      disable the feedback component after verifying the integrity of the asynchronous circuit at the first time;
      enable the feedback component of the asynchronous circuit to perform a second self-test of the asynchronous circuit at a second time in response to a condition of the asynchronous circuit;

verify the integrity of the asynchronous circuit based on the second self-test at the second time; and disable the feedback component after verifying the integrity of the asynchronous circuit at the second time.

16. The system of claim 15, wherein the feedback component comprises a first latch and a second latch.

17. The system of claim 16, wherein, to enable the feedback component, is to:

provide a first clock signal to the first latch and a second clock signal to the second latch, the first clock signal to enable the first latch and the second clock signal to not enable the second latch, the second latch being transparent when it is not enabled, and wherein the asynchronous circuit generates a value that is used in a cryptographic operation based on the first clock signal and the second clock signal, wherein providing the first clock signal and the second clock signal changes the asynchronous circuit from a non-deterministic behavior to a deterministic behavior.

18. The system of claim 15, wherein the asynchronous circuit is a random number generator to generate one or more random values that are used in a cryptographic operation.

19. The system of claim 15, wherein the controller is further to determine a number of values that have been generated by the asynchronous circuit, wherein the condition is the number of values that have been generated by the asynchronous circuit exceeding a threshold number.

20. The system of claim 15, wherein the controller is further to determine an amount of time that has elapsed since the first time, wherein the condition is the amount of time exceeding a threshold amount of time.

* * * * *